(12) United States Patent
Miyahara et al.

(10) Patent No.: US 9,995,338 B2
(45) Date of Patent: Jun. 12, 2018

(54) MOTION GUIDE DEVICE

(71) Applicant: THK CO., LTD., Tokyo (JP)

(72) Inventors: Soshi Miyahara, Tokyo (JP); Hiroshi Ohara, Tokyo (JP)

(73) Assignee: THK CO., LTD., Tokyo (JP)

( * ) Notice: Subject to any disclaimer, the term of this patent is extended or adjusted under 35 U.S.C. 154(b) by 273 days.

(21) Appl. No.: 14/783,738

(22) PCT Filed: Apr. 9, 2014

(86) PCT No.: PCT/JP2014/002039
§ 371 (c)(1),
(2) Date: Oct. 9, 2015

(87) PCT Pub. No.: WO2014/167853
PCT Pub. Date: Oct. 16, 2014

(65) Prior Publication Data
US 2016/0305476 A1    Oct. 20, 2016

(30) Foreign Application Priority Data

Apr. 10, 2013  (JP) .................................. 2013-081951
Apr. 4, 2014   (JP) .................................. 2014-077516

(51) Int. Cl.
*F16C 29/06*    (2006.01)
(52) U.S. Cl.
CPC ........ *F16C 29/064* (2013.01); *F16C 29/0607* (2013.01); *F16C 29/0609* (2013.01)
(58) Field of Classification Search
CPC ................ F16C 29/005; F16C 29/0607; F16C 29/0609; F16C 29/0611; F16C 29/064; F16C 29/0642; F16C 29/0645
See application file for complete search history.

(56) References Cited

U.S. PATENT DOCUMENTS 4,239,298 A   12/1980   Ernst et al.
4,397,802 A    8/1983   Ernst et al.
(Continued)

FOREIGN PATENT DOCUMENTS

JP   53-117152 A   10/1978
JP   61-26822 A    11/1986
(Continued)

OTHER PUBLICATIONS

International Search Report dated Jul. 8, 2014, issued in counterpart application No. PCT/JP2014/002039 (2 pages).

*Primary Examiner* — James Pilkington
(74) *Attorney, Agent, or Firm* — Westerman, Hattori, Daniels & Adrian, LLP

(57) ABSTRACT

A linear guide 10 includes: a track rail 20 having a ball rolling groove 22; a movable block 30 having a loaded ball rolling groove 33 opposing the ball rolling groove 22, an unloaded ball rolling groove 34 extending in parallel with the direction in which the ball rolling groove 22 extends, and a direction change guide groove 35 connecting the loaded ball rolling groove 33 and the unloaded ball rolling groove 34; and a plurality of balls 40 arrayed on an endless circulating path including a loaded ball rolling path 50, an unloaded ball rolling path 60, and a direction change path 70 formed by the track rail 20 and the movable block 30. The direction change path 70 has a plurality of change points where the track changes. By having this configuration, it is possible to provide a linear guide which does not require an end plate.

9 Claims, 13 Drawing Sheets

(56) References Cited

U.S. PATENT DOCUMENTS

| | | | |
|---|---|---|---|
| 4,634,296 A | | 1/1987 | Watanabe |
| 4,652,147 A | | 3/1987 | Geka |
| 5,145,260 A | | 9/1992 | Edelmann et al. |
| 6,158,373 A | * | 12/2000 | Lange .................. B63H 9/08 114/112 |
| 7,600,918 B2 | * | 10/2009 | Shirai ................ F16C 29/0602 384/45 |
| 7,942,579 B2 | * | 5/2011 | Shirai ................ F16C 29/0602 29/898.03 |
| 2008/0112656 A1 | * | 5/2008 | Shirai ................ F16C 29/0604 384/45 |
| 2009/0185765 A1 | | 7/2009 | Shirai et al. |
| 2010/0098358 A1 | | 4/2010 | Shirai |

FOREIGN PATENT DOCUMENTS

| | | | |
|---|---|---|---|
| JP | 62-4922 A | | 1/1987 |
| JP | 4-228917 A | | 8/1992 |
| JP | 2000-87966 A | | 3/2000 |
| JP | 2003-120669 A | | 4/2003 |
| JP | 2004-108474 A | | 4/2004 |
| JP | 2008-248944 A | | 10/2008 |
| WO | 2006/022242 A1 | | 3/2006 |
| WO | 2008/038674 A1 | | 4/2008 |
| WO | WO2008041589 | * | 4/2008 |
| WO | 2008/065878 A1 | | 6/2008 |
| WO | 2009/037931 A1 | | 3/2009 |

\* cited by examiner

[Fig. 1]
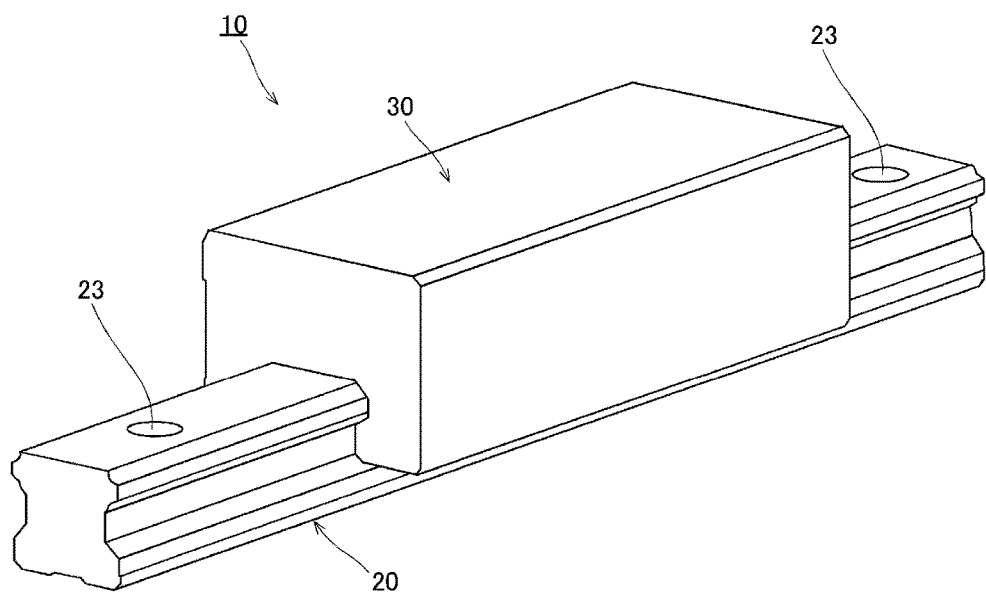

[Fig. 2]
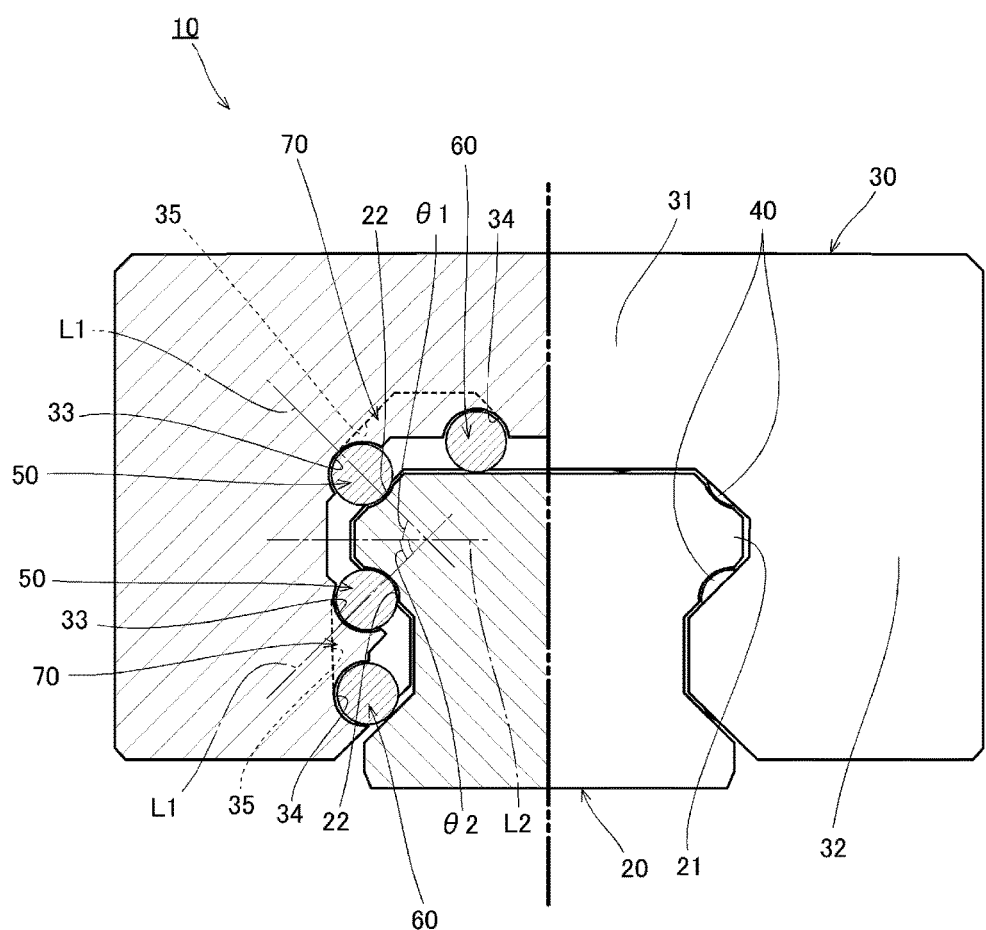

[Fig. 3]
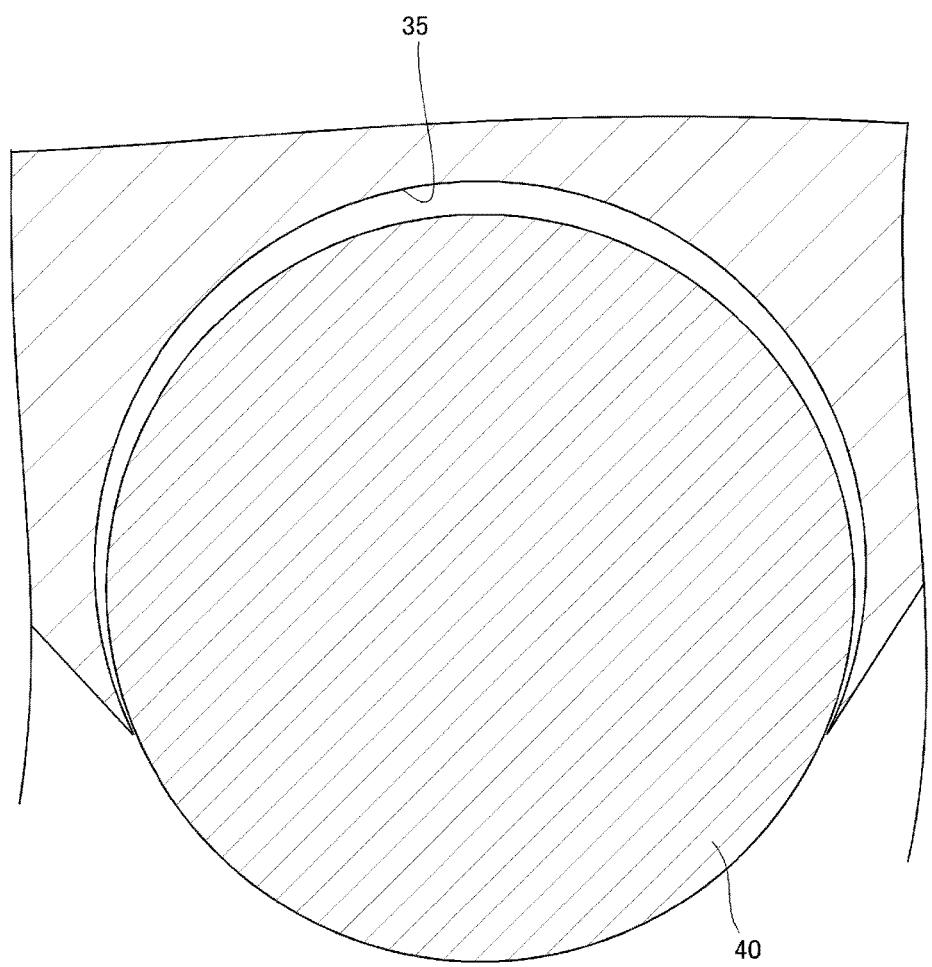

[Fig. 4]
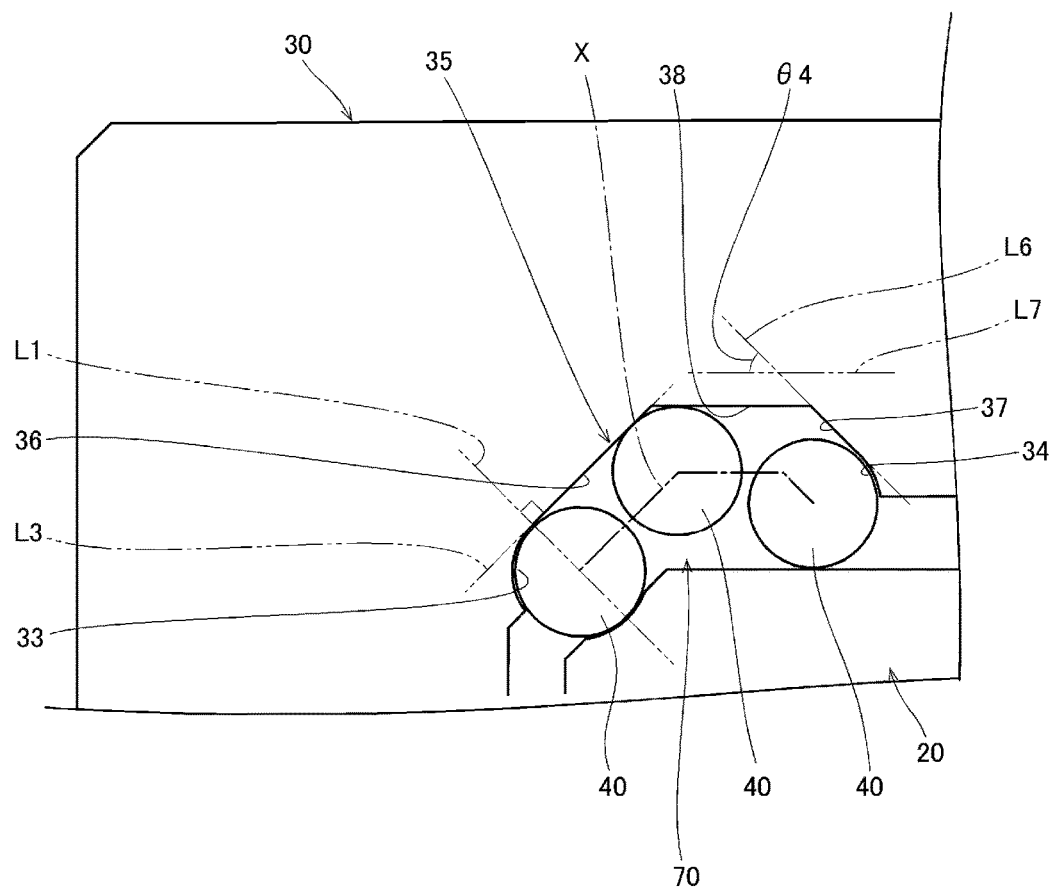

[Fig. 5]
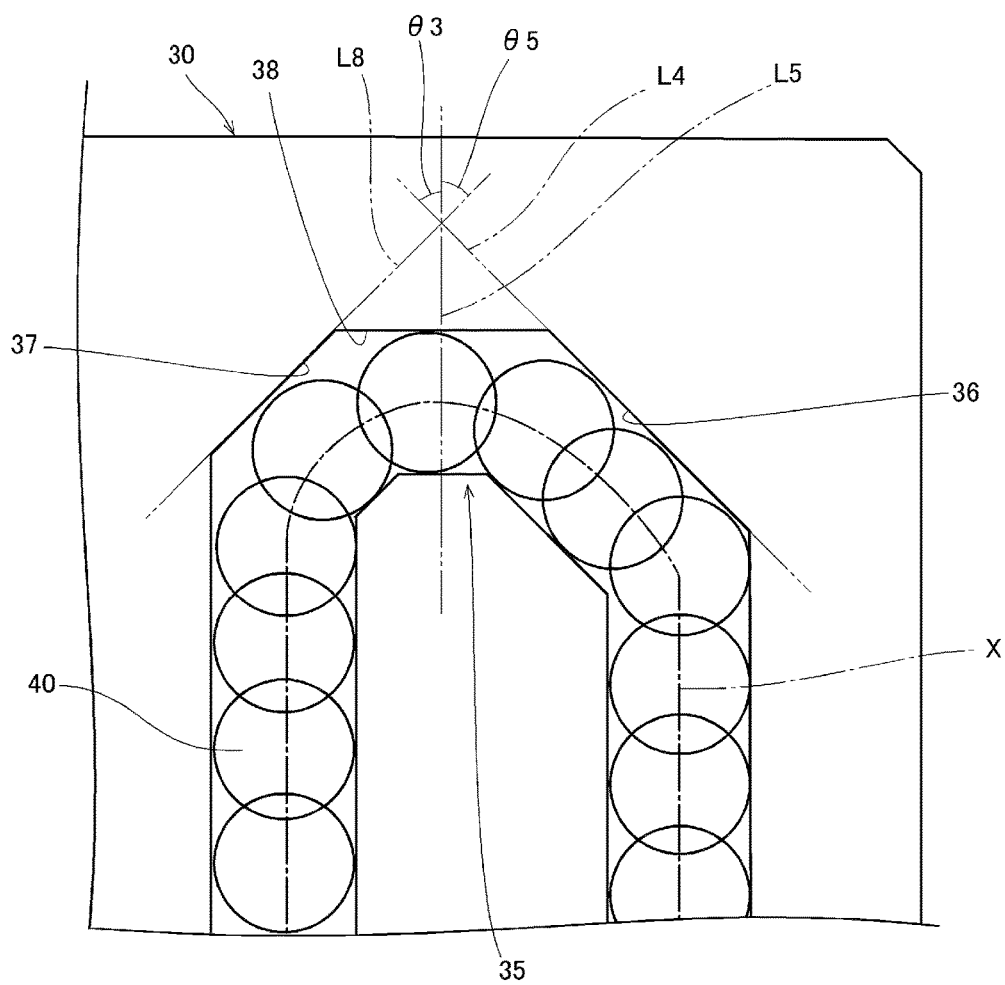

[Fig. 6]
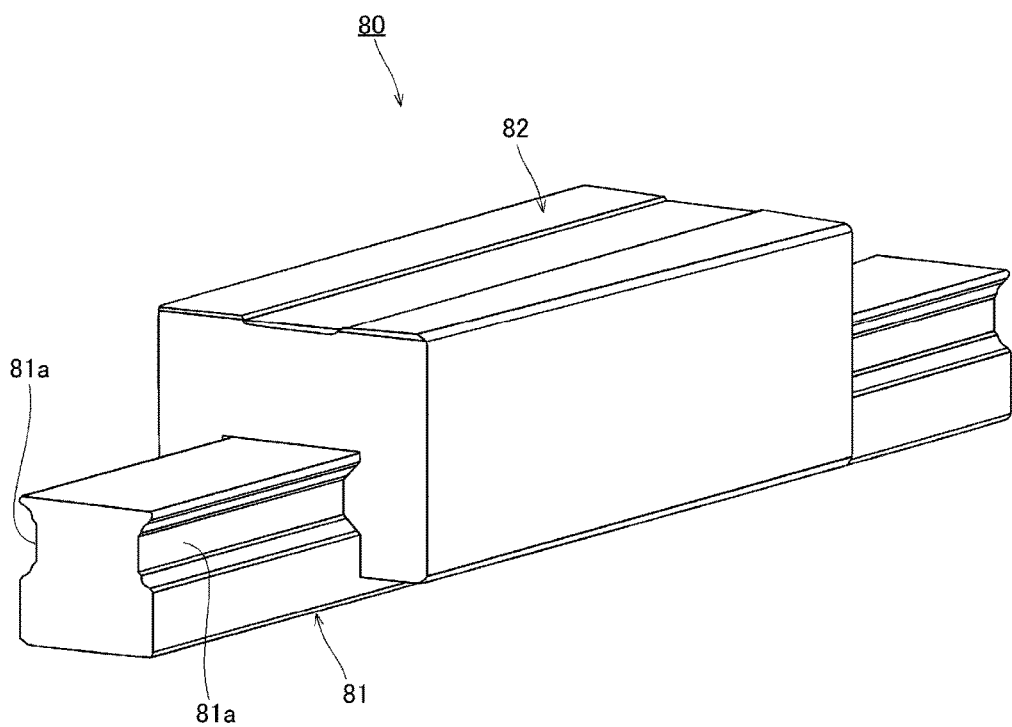

[Fig. 7]
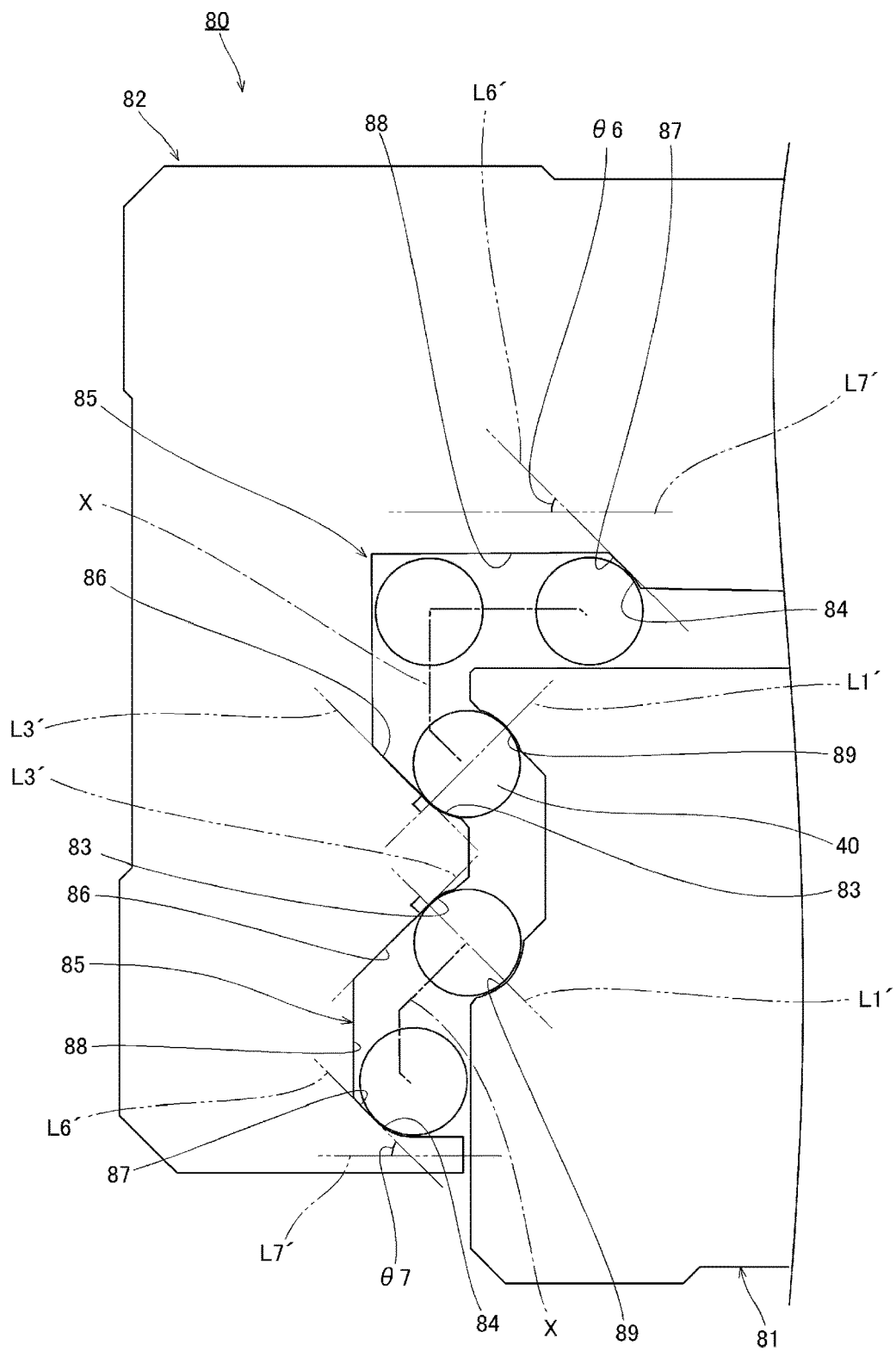

[Fig. 8]
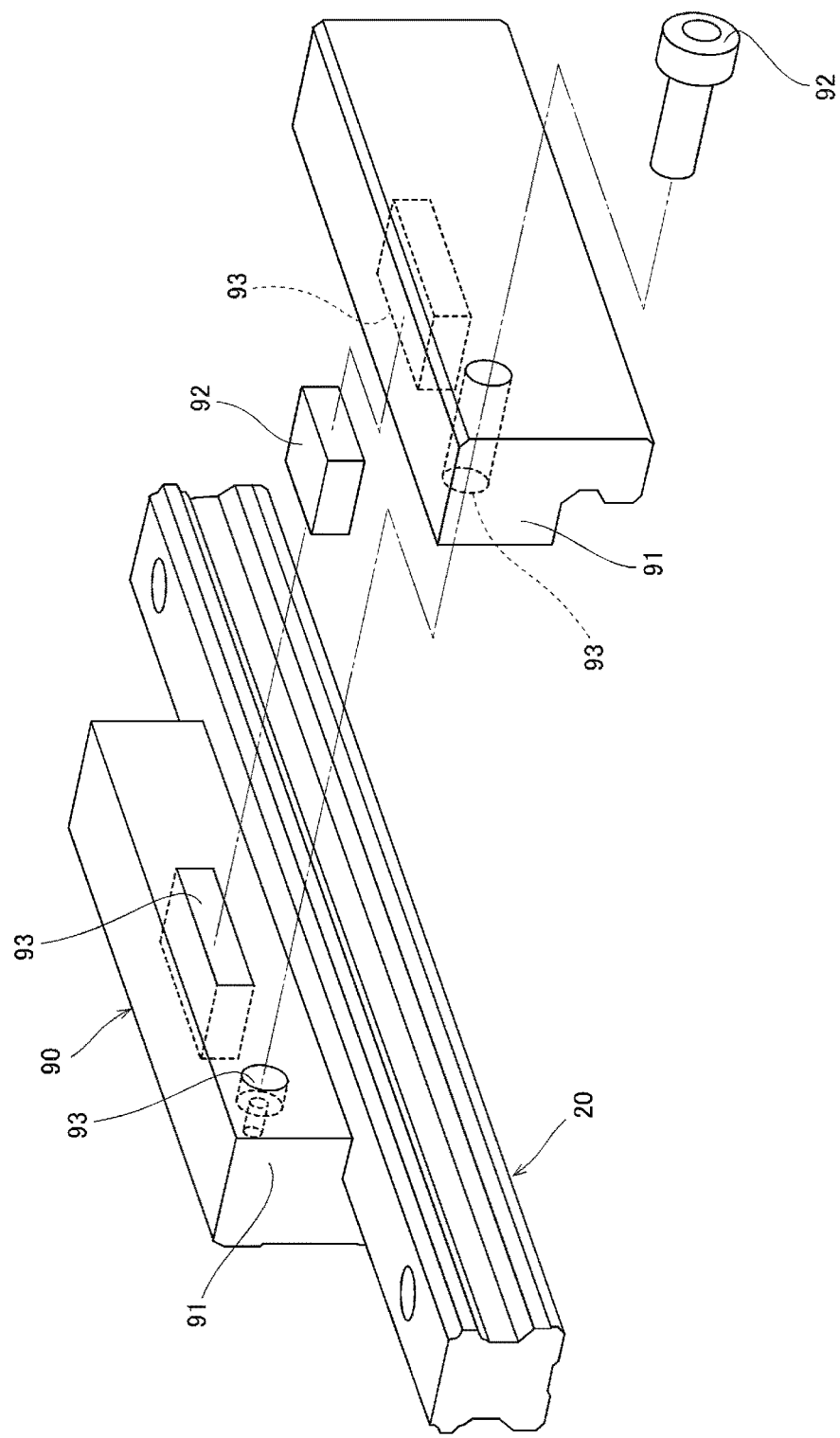

[Fig. 9]
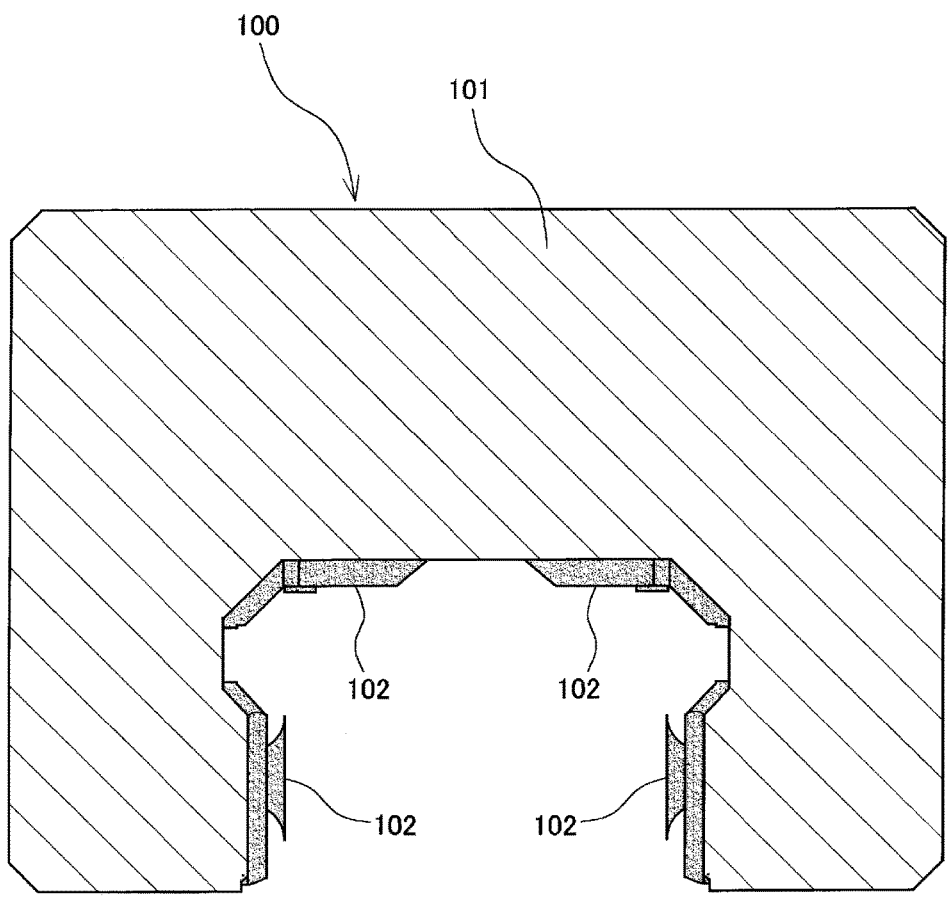

[Fig. 10]
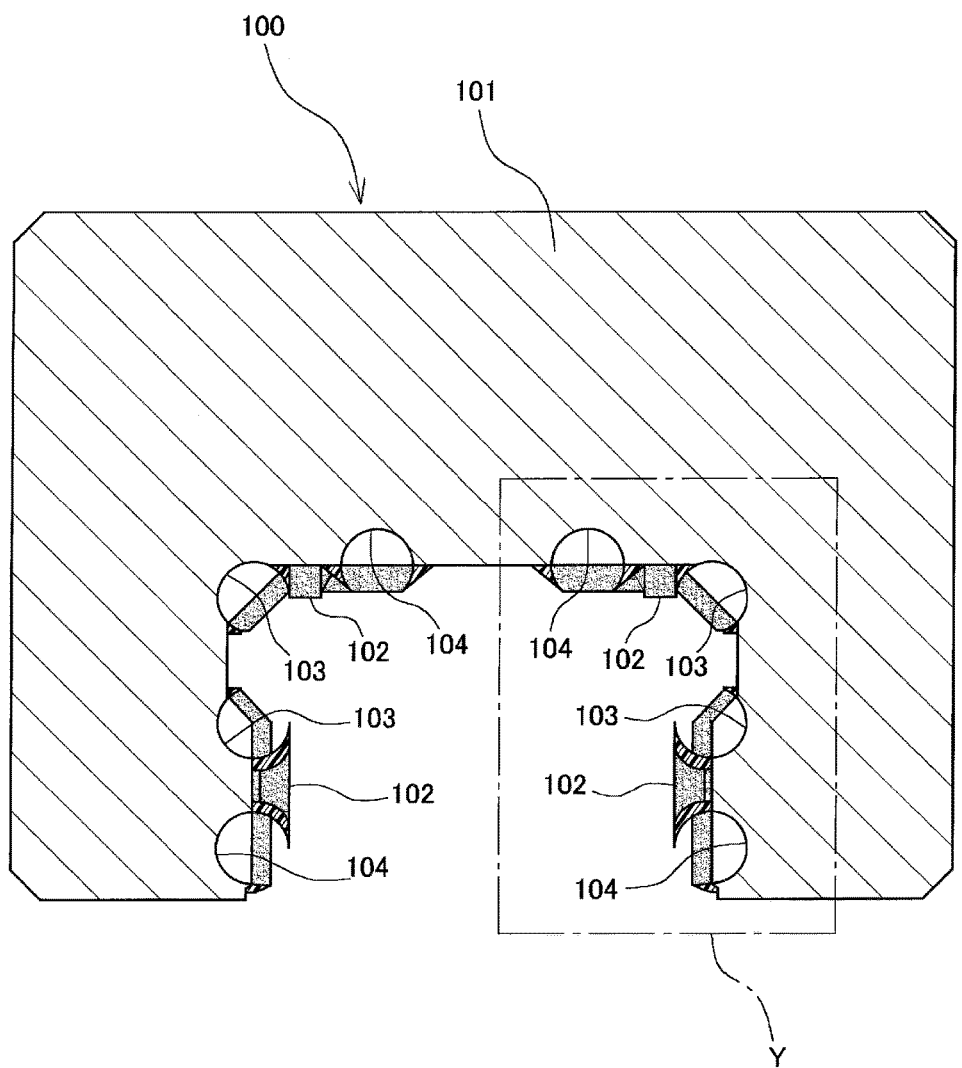

[Fig. 11]
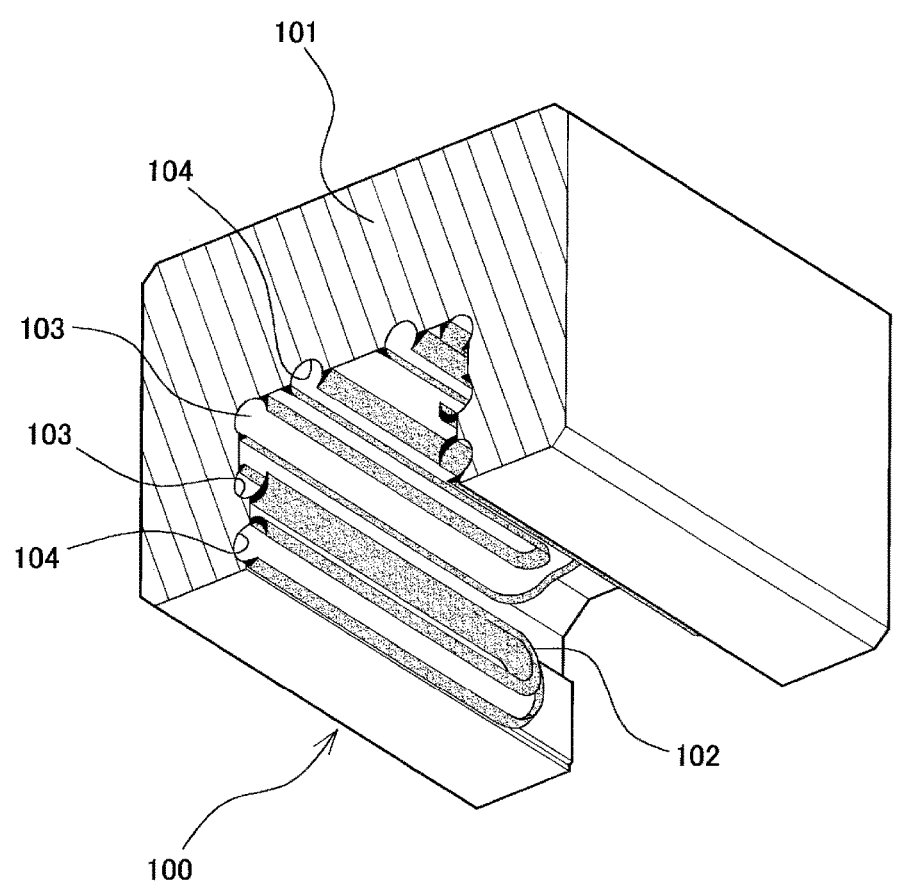

[Fig. 12]
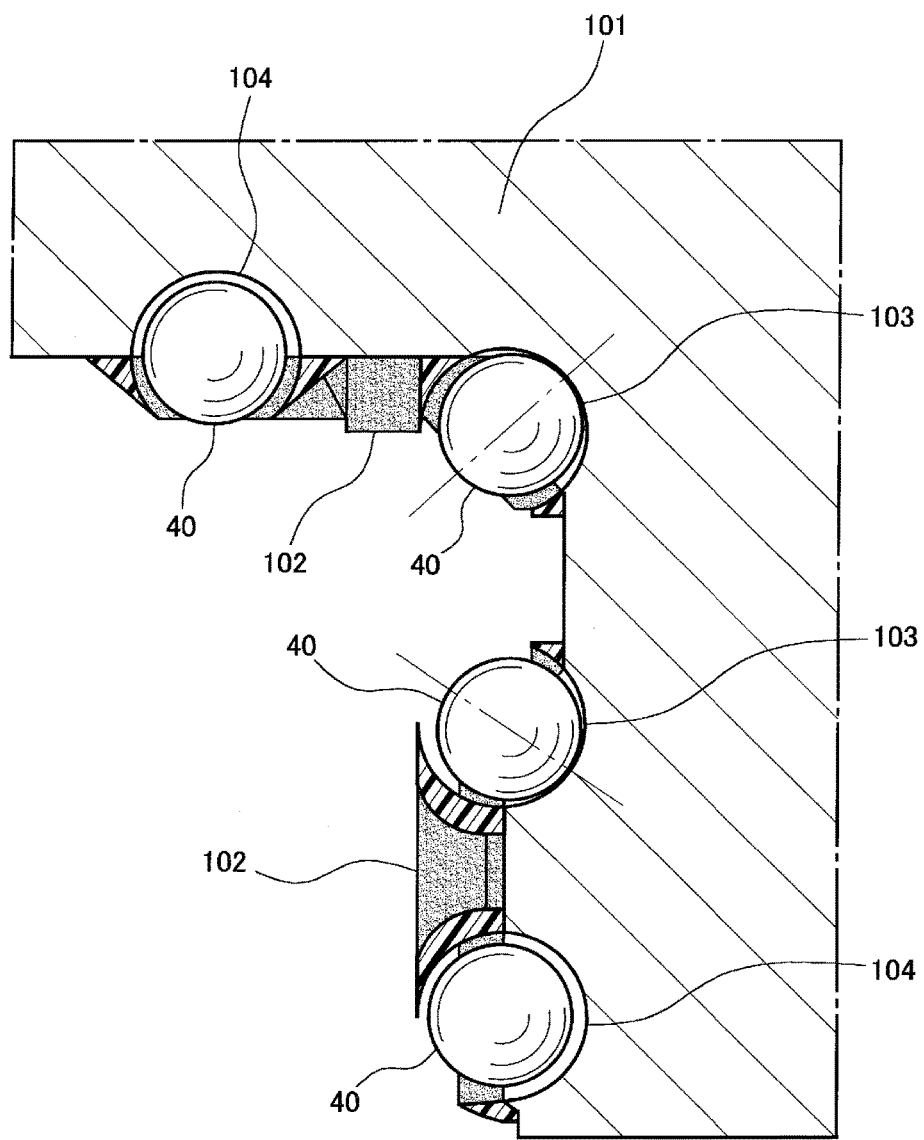

[Fig. 13]
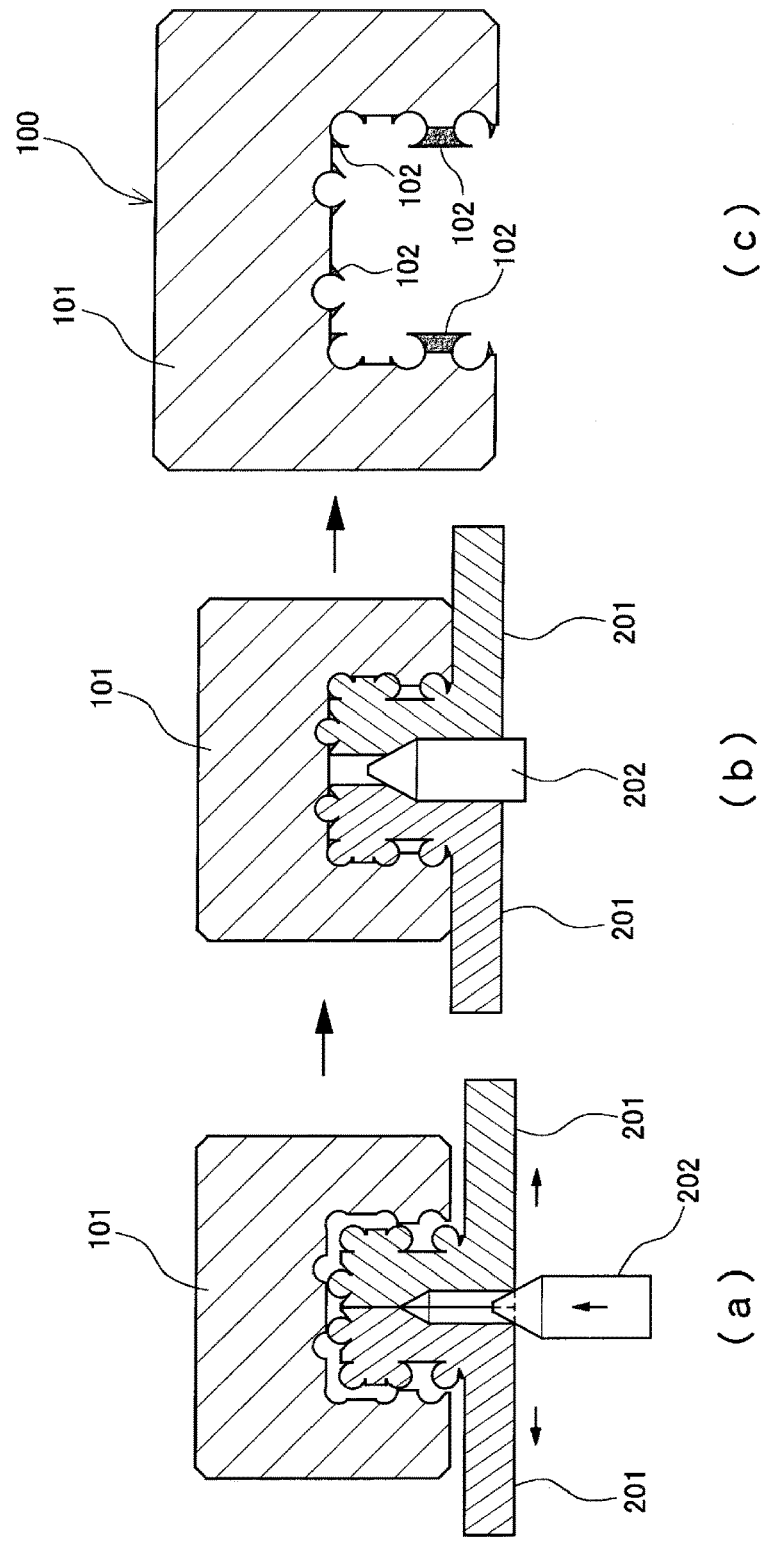

MOTION GUIDE DEVICE

TECHNICAL FIELD

The present invention relates to a motion guide device in which a rolling element is interposed between a track member and a moving member.

BACKGROUND ART

A linear guide as this kind of a motion guide device includes a track rail attached to a fixing portion and a movable block fixed to a movable portion. The movable block is assembled onto the track rail in a linearly movable manner. Between the track rail and the movable block, a plurality of balls is rollably interposed in order to reduce frictional resistance. On the movable block, an endless circulating path is arranged for circulating the balls. The endless circulating path of the linear guide is formed with a loaded ball rolling path arranged between a ball rolling groove of the track rail and a loaded ball rolling groove of the movable block, an unloaded ball rolling path that is parallel to the loaded ball rolling path, and a pair of U-shaped direction change paths each connecting the loaded ball rolling path and the unloaded ball rolling path (e.g., see Patent Literature 1 shown below).

The pair of direction change paths is arranged on lid members on both end sides in a moving direction of the movable block, and the direction change paths are each formed in a combination of an end plate having a direction change portion on an outer peripheral side and an R piece fitted into the end plate as a direction change portion on an inner peripheral side. In other words, the linear guide is formed by using the end plate not only as the lid members, but also as part of direction change paths.

CITATION LIST

Patent Literature

Patent Literature 1: JP 2008-248944 A

DISCLOSURE OF THE INVENTION

Problems to be Solved by the Invention

However, because such an end plate constitutes part of an endless circulating path for balls, there is a possibility that the end plate causes prevention of a movable block from being moved in a relatively stable manner on a track rail if a failure occurs in the end plate. In other words, the end plate being attached to form the endless circulating path for the balls is one of the main components that determine a life of the linear guide.

In addition, since a process for attaching an end plate onto a movable block requires a variety of members to be used, and thus the process was complicated, there is a need for more simply producible linear guides.

The present invention has been made in view of the above-mentioned problems, and has an object to extend a life of a linear guide. In addition, another object of the present invention is to shorten a period to manufacture the linear guide.

Means for Solving the Problems

A motion guide device according to the present invention includes: a track member having a rolling element rolling groove extending in a longitudinal direction; a moving member having a loaded rolling element rolling groove facing the rolling element rolling groove of the track member, an unloaded rolling element rolling groove extending in parallel to a direction in which the rolling element rolling groove extends, and a direction change guide groove connecting the loaded rolling element rolling groove and the unloaded rolling element rolling groove; and a plurality of rolling elements arranged on an endless circulating path including a loaded rolling element rolling path arranged between the rolling element rolling groove of the track member and the loaded rolling element rolling groove of the moving member, an unloaded rolling element rolling path arranged between the track member and the unloaded rolling element rolling groove, and a direction change path arranged between the track member and the direction change guide groove, wherein the direction change path has a plurality of change points where a track bends.

Effects of the Invention

According to the present invention, a life of a linear guide can be extended, while shortening a period to manufacture the linear guide.

BRIEF DESCRIPTION OF THE DRAWINGS

FIG. 1 is a perspective view illustrating a linear guide in accordance with a first embodiment.

FIG. 2 is a partially cross-sectional front view illustrating the linear guide in accordance with the first embodiment.

FIG. 3 is an enlarged cross-sectional view illustrating a direction change guide groove in accordance with the first embodiment.

FIG. 4 is a schematic cross-sectional view taken orthogonally to a longitudinal direction of a track rail in accordance with the first embodiment.

FIG. 5 is a schematic cross-sectional view taken vertically in a width direction of a movable block in accordance with the first embodiment.

FIG. 6 is a perspective view illustrating a linear guide in accordance with a second embodiment.

FIG. 7 is a schematic cross-sectional view taken orthogonally to a longitudinal direction of a track rail in accordance with the second embodiment.

FIG. 8 is a view illustrating one of a variety of modified examples of a movable block in accordance with the first and second embodiments.

FIG. 9 is a front view of a movable block in accordance with a modified example.

FIG. 10 is a vertical cross-sectional front view of the movable block in accordance with the modified example.

FIG. 11 is a perspective, cross-sectional view taken vertically at a central portion of the movable block shown in FIG. 10.

FIG. 12 is an enlarged view of a portion indicated by Y in FIG. 10.

FIGS. 13(a) to 13(c) are views illustrating a method for manufacturing the movable block in accordance with the modified example of the present invention.

MODE FOR CARRYING OUT THE INVENTION

Some advantageous embodiments for implementing the present invention will be described herein with reference to the drawings. In addition, the embodiments described below neither limits the present invention claimed in CLAIMS, nor requires all combinations of the features described in the embodiments in order to achieve the object of the present invention.

[First Embodiment]

FIG. 1 is a perspective view illustrating a linear guide in accordance with a first embodiment. FIG. 2 is a partially cross-sectional front view illustrating the linear guide in accordance with the first embodiment. FIG. 3 is an enlarged cross-sectional view illustrating a direction change guide groove in accordance with the first embodiment. FIG. 4 is a schematic cross-sectional view taken orthogonally to a longitudinal direction of a track rail in accordance with the first embodiment. FIG. 5 is a schematic cross-sectional view taken orthogonally to a width direction of a track rail in accordance with the first embodiment.

As shown in FIG. 1, a linear guide 10 includes a track rail 20 as a track member extending linearly and a movable block 30 assembled in a linearly movable manner to the track rail 20 through balls 40 as a plurality of rolling elements.

The track rail 20 has an approximately rectangular shape when seen in cross-section and is formed to extend in a long and thin manner. On an upper portion of the track rail 20, a DF structure is formed, where a left and right pair of projections 21 protrudes in a width direction. On an upper portion and a lower portion of the projections 21, a ball rolling groove 22 is formed as a rolling element rolling groove extending in a longitudinal direction of the track rail 20. In the first embodiment of the present invention, totally four ball rolling grooves 22 are formed, two on each of the left and right pair of the projections 21. On the track rail 20, in addition, through holes 23 are formed from a top surface toward a bottom surface to each pass through a bolt for attaching the track rail 20 onto a fixing portion as an installation surface.

A cross-sectional shape of the ball rolling groove 22 is formed for example as a circular arc groove shape consisting of a single arc. A radius of curvature of the ball rolling groove 22 is slightly greater than a radius of the ball 40, allowing the ball 40 to contact at a single point to the ball rolling groove 22.

The movable block 30 includes, when the track rail 20 is arranged on a horizontal plane, a central portion 31 facing the top surface of the track rail 20 and a pair of side wall units 32 extending downward from both left and right sides of the central portion 31 and facing left and right sides of the track rail 20. The movable block 30 is entirely formed in a saddle shape.

The movable block 30 is formed with a loaded ball rolling groove 33 as a loaded rolling element rolling groove facing the ball rolling groove 22 of the track rail 20, an unloaded ball rolling groove 34 as an unloaded rolling element rolling groove extending in parallel to a direction in which the ball rolling groove 22 extends, and a direction change guide groove 35 arranged to connect the loaded ball rolling groove 33 and the unloaded ball rolling groove 34. In addition, the loaded ball rolling groove 33, the unloaded ball rolling groove 34, and the direction change guide groove 35 are formed on an inner wall surface of the saddle-formed movable block 30, the inner wall surface facing the track rail 20.

When seen in cross-section, the loaded ball rolling groove 33 is formed as a circular arc groove shape consisting of a single arc, as in the ball rolling groove 22. The radius of curvature of the loaded ball rolling groove 33 is slightly greater than the radius of the ball 40, allowing the ball 40 to contact at a single point to the loaded ball rolling groove 33.

A contact angle line L1 represents a line connecting a contact point at which the ball 40 comes into contact with the ball rolling groove 22 of the track rail 20 and a contact point at which the ball 40 comes into contact with the loaded ball rolling groove 33 of the movable block 30. The contact angle line L1 indicates a direction in which the ball 40 receives a load. In the first embodiment, a contact angle θ1 formed between the contact angle line L1 of the ball 40 on an upper side and a horizontal line L2 is 45°, while a contact angle θ2 formed between the contact angle line L1 of the ball 40 on a lower side and the horizontal line L2 is also 45°. With such a configuration, the linear guide 10 can bear loads in upward, downward, leftward, and rightward directions in a balanced manner.

The direction change guide groove 35 has segments including a loaded region entry and exit groove portion 36 formed on a side of the loaded ball rolling groove 33, an unloaded region entry and exit groove portion 37 formed on a side of the unloaded ball rolling groove 34, and a groove connection portion 38 connecting the loaded region entry and exit groove portion 36 and the unloaded region entry and exit groove portion 37. The loaded region entry and exit groove portion 36 forming a segment of the direction change guide groove 35 is formed so that the ball 40 exits from or enters into a loaded region. The unloaded region entry and exit groove portion 37 forming another segment of the direction change guide groove 35 is formed so that the ball 40 exits from or enters into an unloaded region. Here, in the groove connection portion 38, the ball 40 is rolled in a moving direction of the movable block 30 and an approximately vertical direction.

In other words, in the first embodiment, a track for the ball 40 bends at a connection point at which the loaded region entry and exit groove portion 36 and the groove connection portion 38 are connected and a connection point at which the groove connection portion 38 and the unloaded region entry and exit groove portion 37 are connected. That is, as the direction change guide groove 35 according to the first embodiment has a configuration having a plurality of change points at which the track bends, the track in the direction change guide groove 35 (i.e., direction change path 70 described later) is shortened so as to allow the ball 40 to run normally without meandering, achieving stable motion guiding.

In addition, as shown in FIG. 3, the direction change guide groove 35 is formed in a C-shape when seen in cross-section. The radius of curvature of the direction change guide groove 35 is formed slightly greater than the radius of the ball 40. In addition, the direction change guide groove 35 is formed to have a slight undercut shape. The direction change guide groove 35 including the undercut portion supports the ball 40 on an inner periphery surface.

Between the ball rolling groove 22 and the loaded ball rolling groove 33, a loaded ball rolling path 50 is formed as a loaded rolling element rolling path extending linearly. Between the unloaded ball rolling groove 34 and a peripheral surface of the track rail 20, an unloaded ball rolling path 60 is formed as an unloaded rolling element rolling path extending linearly. Further, between the direction change guide groove 35 and the peripheral surface of the track rail 20, a direction change path 70 is formed so as to connect the loaded ball rolling path 50 and the unloaded ball rolling path 60. The loaded ball rolling path 50, the unloaded ball rolling path 60, and the direction change path 70 form an endless circulating path.

When the movable block 30 is moved relatively to the track rail 20, the plurality of the balls 40 rolls on the loaded ball rolling path 50 while receiving a load. The balls 40 rolled to an end of the loaded ball rolling path 50 pass through a side of a pair of the direction change paths 70, and then enter into the unloaded ball rolling path 60. The balls 40 passed through the unloaded ball rolling path 60 pass through another side of the pair of the direction change paths 70, and then enter again into the loaded ball rolling path 50.

Here, the direction change path 70 formed between the direction change guide groove 35 and the peripheral surface of the track rail 20 is described in detail with reference to FIGS. 4 and 5.

Dashed-dotted lines shown in FIGS. 4 and 5 are virtual curves X drawn by a locus of the center of the ball 40 when the ball 40 rolls on the endless circulating path.

The direction change guide groove 35 in the endless circulating path arranged and formed above the top surface of the track rail 20 is formed to connect an edge of the loaded ball rolling groove 33 and an edge of the unloaded ball rolling groove 34 so as to bypass an outer periphery of the track rail 20. Therefore, the direction change guide groove 35 is not formed linearly when seen in front view, but formed in a complex turn in which angles are changed twice. Respective portions where an angle is changed is a connection point between the loaded region entry and exit groove portion 36 and the groove connection portion 38 and a connection point between the unloaded region entry and exit groove portion 37 and the groove connection portion 38. Furthermore, for the direction change guide groove 35 arranged and formed on sides of the track rail 20, because a space is created on a direction change side of the ball 40 due to a protrusion shaped portion of the projection 21, when the direction change path 70 is formed along the track rail 20, the ball 40 does not come into contact with the track rail 20. Consequently, as a U-shaped turn can be formed along the inner wall surface of the movable block 30 for changing ball directions, different from the endless circulating path on an upper portion, the endless circulating path on a lower portion does not form a complex turn. However, the scope of the present invention is not limited to this, and the direction change guide groove on a lower side may be constructed to form a complex turn, as in the direction change guide groove on the upper portion.

The loaded region entry and exit groove portion 36 is formed, from an edge of the loaded ball rolling groove 33, along the inner wall surface of the movable block and a surface of the outer periphery of the track rail 20. As shown in FIG. 4, when seen in cross-section orthogonal to a longitudinal direction of the track rail 20, the loaded region entry and exit groove portion 36 is formed so that an extended line L3 of the loaded region entry and exit groove portion 36 and a line indicating a loaded direction of a load received by the ball 40 in the loaded ball rolling groove 33 (i.e., a direction of the contact angle line L1 which is a line connecting a contact point between the ball rolling groove 22 of the track rail 20 and the ball 40 and a contact point between the loaded ball rolling groove 33 of the movable block 30 and the ball 40) cross at right angles. Additionally, as shown in FIG. 5, when seen in cross-section orthogonal to a width direction of the track rail 20, the loaded region entry and exit groove portion 36 is formed so that an intersection angle θ3 formed between an extended line L4 of the loaded region entry and exit groove portion 36 and a line L5 indicating a moving direction of the movable block 30 is 45°. Then, the loaded region entry and exit groove portion 36 is connected to the groove connection portion 38 at a linearly extended position where a gap is created between the ball 40 for support and the top surface of the track rail 20.

As shown in FIGS. 4 and 5, the groove connection portion 38 is formed in parallel to the top surface of the track rail 20. The groove connection portion 38 is connected to the unloaded region entry and exit groove portion 37 at an extended position.

As shown in FIG. 4, the unloaded region entry and exit groove portion 37 is formed, when seen in cross-section orthogonal to a longitudinal direction of the track rail 20, so that an angle θ4 at which an extended line L6 of the unloaded region entry and exit groove portion 37 and a line L7 indicating a width direction of the movable block 30 intersect is 45°. Further, as shown in FIG. 5, when seen in cross-section orthogonal to a width direction of the track rail 20, the unloaded region entry and exit groove portion 37 is formed so that an intersection angle θ5 formed between an extended line L8 of the unloaded region entry and exit groove portion 37 and a line L5 indicating the moving direction of the movable block 30 is 45°. At an extended position of these unloaded region entry and exit groove portion 37, the unloaded ball rolling groove 34 is formed, and the unloaded region entry and exit groove portion 37 and the unloaded ball rolling groove 34 are connected.

In other words, the direction change guide groove 35 is formed along the inner wall surface of the movable block 30, as well as is formed apart from the surface of the outer periphery of the track rail 20 to have a longer distance than a diameter of the ball 40 so that the ball rolling on the direction change guide groove 35 does not come into contact with the surface of the outer periphery of the track rail 20. When the direction change guide groove 35 is formed in such a manner, a virtual curve X drawn by a locus of the center of the ball 40 when the ball 40 rolls on the endless circulating path does not appear on a single plane. That is, since such a virtual curve X does not appear on a single plane, a high degree of freedom is present in designing paths for the direction change guide groove 35. From this, although formation positions for the direction change guide groove 35 to be formed relative to the inner wall surface of the movable block 30 were restricted in design basis in accordance with shapes of the movable block 30 and the track rail 20, the direction change guide groove 35 can be formed in any path shape without taking into account such restrictions, in accordance with the present embodiment. Consequently, as an endless circulating path can be formed with the movable block 30 and the track rail 20, a linear guide 10 that does not require separate end plates can be provided.

According to the configuration described above, since an endless circulating path can be formed without forming, on a single plane, a virtual curve X drawn by a locus of the center of the ball 40 when the ball 40 rolls on the endless circulating path, tracks of the direction change path 70 can be shortened, and the ball 40 can be prevented from being meandered, and a stable motion guide can be provided. In addition, according to this first embodiment, a groove for forming an endless circulating path can be formed on the inner wall surface of the movable block 30. Consequently, a linear guide 10 without having an end plate can be provided, and it is possible to reduce a quantity of parts necessary for manufacturing the linear guide 10, thus reducing a human hour for assembly along with the reduced part quantity, and shortening a period to manufacture the linear guide 10.

In addition, according to this first embodiment, because no end plate is required, it is able to prevent any end plate related failures from being occurred. Consequently, it is possible to intend to extend a life of the linear guide 10.

Further, with this first embodiment, because an endless circulating path are formed on an inner wall surface of a saddle shape, the linear guide 10 can be manufactured without forming a through hole that has been required to form the endless circulating path. Consequently, as a space available for the movable block 30 increases, improving the degree of design freedom, and allowing manufacture of a variety of linear guides.

[Second Embodiment]

As shown in FIG. 2, the linear guide 10 according to the first embodiment described above is constructed so that the contact angle lines L1 of the balls 40 circulating in the endless circulating paths on the upper and lower portions intersect inside the track rail 20. Such a configuration is referred to as a DF structure, achieving a particularly superior alignment performance.

However, the present invention is not limited to the linear guide 10 including such a DF structure shown in FIG. 2. As shown in FIGS. 6 and 7, for example, the present invention is applicable to a linear guide 80 including a structure, so-called a DB structure, constructed to allow contact angle lines L1' of the balls 40 circulating in endless circulating paths on the upper and lower portions to intersect outside a track rail 82.

Next, the linear guide 80 formed with a DB structure, according to a second embodiment, will be described. Furthermore, the linear guide 80 according to this second embodiment is described with reference to FIGS. 6 and 7 for its configuration and operations. For the same or similar components to the components described in FIGS. 1 to 5, the same reference signs are applied, but their descriptions may be omitted.

Here, FIG. 6 is a perspective view illustrating a linear guide in accordance with the second embodiment. In addition, FIG. 7 is a partial cross-sectional front view illustrating a configuration example of the linear guide including a DB structure in accordance with the second embodiment.

The linear guide 80 according to the second embodiment includes, as shown in FIG. 6, a track rail 81 as a track member extending linearly and a movable block 82 assembled in a linearly movable manner to the track rail 81 through balls 40 as a plurality of rolling elements.

The track rail 81 has an approximately rectangular shape when seen in cross-section and is formed to extend in a long and thin manner. At a position slightly downward from an upper portion of the track rail 81, a left and right pair of recessed portions 81a recessed in a width direction is formed. Therefore, it is conceivable that the linear guide 80 according to the second embodiment consists of a DB structure. On a respective upper portion and the lower portion of the recessed portions 81a, a ball rolling groove 89 is formed as a rolling element rolling groove extending in a longitudinal direction of the track rail 81. In the second embodiment, totally four ball rolling grooves 89 are formed, two on each of the left and right pair of the recessed portion 81a.

Then, as shown in FIG. 7, since a direction change guide groove according to the second embodiment is formed so that the track rail 81 is protruded from the upper and lower portion of the recessed portion 81a in a width direction toward a direction change path positioned to face each other, not only the direction change path formed on the upper portion, but also the direction change path formed on the lower portion are formed with a complex turn.

The ball direction change grooves 85 on the upper and lower portions respectively have a loaded region entry and exit groove portion 86 formed on a side of a loaded ball rolling groove 83, an unloaded region entry and exit groove portion 87 formed on a side of an unloaded ball rolling groove 84, and a groove connection portion 88 connecting the loaded region entry and exit groove portion 86 and the unloaded region entry and exit groove portion 87. The loaded region entry and exit groove portion 86 is formed so that the ball 40 exits from or enters into a loaded region. The unloaded region entry and exit groove portion 87 is formed so that the ball 40 exits from or enters into an unloaded region.

The ball direction change groove 85 in an endless circulating path on the respective upper and lower portions is formed to connect an edge of the loaded ball rolling groove 83 and an edge of the unloaded ball rolling groove 84 so as to bypass an outer periphery of the track rail 81. Therefore, the direction change guide groove 85 is not formed linearly when seen in front view, but formed in a complex turn in which an angle is changed once. A portion where an angle is changed is a connection point between the loaded region entry and exit groove portion 86 and the groove connection portion 88 and a connection point between the unloaded region entry and exit groove portion 87 and the groove connection portion 88.

The loaded region entry and exit groove portion 86 on the upper portion is formed to extend along the track rail 81 from an edge of loaded ball rolling groove 83. As shown in FIG. 7, when seen in cross-section orthogonal to a longitudinal direction of the track rail 81, the loaded region entry and exit groove portion 86 is formed so that an extended line L3' of the loaded region entry and exit groove portion 86 and a line indicating a loaded direction of a load received by the ball 40 in the loaded ball rolling groove 83 (i.e., a direction of the contact angle line L1' which is a line connecting a contact point between the ball rolling groove 89 of the track rail 81 and the ball 40 and a contact point between the loaded ball rolling groove 83 of the movable block 82 and the ball 40) cross at right angles. Additionally, when seen in cross-section orthogonal to a width direction of the track rail 81, the loaded region entry and exit groove portion 86 is formed so that an angle at which an extended line of the loaded region entry and exit groove portion 86 and a line indicating a moving direction of the movable block 82 intersect is 45°. Then, the loaded region entry and exit groove portion 86 is connected to the groove connection portion 88 at a linearly extended position along the track rail 81.

The groove connection portion 88 on the upper portion is formed so as to connect the loaded region entry and exit groove portion 86 on the upper portion and the unloaded region entry and exit groove portion 87 on the upper portion, bypassing the outer periphery of the track rail 81.

As shown in FIG. 7, the unloaded region entry and exit groove portion 87 on the upper portion is formed, when seen in cross-section orthogonal to a longitudinal direction of the track rail 81, so that an intersection angle θ6 formed between an extended line L6' of the unloaded region entry and exit groove portion 87 and a line L7' indicating a width direction of the movable block 82 is 45°. Further, when seen in cross-section orthogonal to a width direction of the track rail 81, the unloaded region entry and exit groove portion 87 is formed so that an angle at which an extended line of the unloaded region entry and exit groove portion 87 and a line indicating a moving direction of the movable block 82 intersect is 45°. At an extended position of the unloaded region entry and exit groove portion 87, the unloaded ball rolling groove 84 is formed, and the unloaded region entry and exit groove portion 87 and the unloaded ball rolling groove 84 are connected.

The loaded region entry and exit groove portion 86 on the lower portion is formed to extend along the track rail 81 from an edge of the loaded ball rolling groove 83. As shown in FIG. 7, when seen in cross-section orthogonal to a longitudinal direction of the track rail 81, the loaded region entry and exit groove portion 86 is formed so that an extended line L3' of the loaded region entry and exit groove portion 86 and a line indicating a loaded direction of a load received by the ball 40 in the loaded ball rolling groove 83 (i.e., a direction of the contact angle line L1' which is a line connecting a contact point between the ball rolling groove 89 of the track rail 81 and the ball 40 and a contact point between the loaded ball rolling groove 83 of the movable block 82 and the ball 40) cross at right angles. Additionally, when seen in cross-section orthogonal to a width direction of the track rail 81, the loaded region entry and exit groove portion 86 is formed so that an angle at which an extended line of the loaded region entry and exit groove portion 86 and a line indicating a moving direction of the movable block 82 intersect is 45°. Then, the loaded region entry and exit groove portion 86 is connected to the groove connection portion 88 at a linearly extended position along the track rail 81.

The groove connection portion 88 on the lower portion is formed along the outer periphery of the track rail 81 so as to connect the loaded region entry and exit groove portion 86 on the lower portion and the unloaded region entry and exit groove portion 87 on the lower portion.

As shown in FIG. 7, the unloaded region entry and exit groove portion 87 on the lower portion is formed, when seen in cross-section orthogonal to a longitudinal direction of the track rail 81, so that an intersection angle θ7 formed between an extended line L6' of the unloaded region entry and exit groove portion 87 and a line L7' indicating a width direction of the movable block 82 is 45°. Further, when seen in cross-section orthogonal to a width direction of the track rail 81, the unloaded region entry and exit groove portion 87 is formed so that an angle at which an extended line of the unloaded region entry and exit groove portion 87 and a line indicating a moving direction of the movable block 82 intersect is 45°. At an extended position of these unloaded region entry and exit groove portion 87, the unloaded ball rolling groove 84 is formed, and the unloaded region entry and exit groove portion 87 and the unloaded ball rolling groove 84 are connected.

With the linear guide 80 according to the second embodiment formed in such a manner, as an endless circulating path can be formed, while a virtual curve X drawn by a locus of the center of the ball 40 when the ball 40 rolls on the endless circulating path does not appear on a single plane, a groove to form an endless circulating path can be formed on an inner wall surface of the movable block 81. Consequently, the linear guide 80 without having an end plate can be provided, and it is possible to reduce a quantity of parts necessary for manufacturing the linear guide 80, thus reducing a human hour for assembly along with the reduced part quantity, and shortening a period to manufacture the linear guide 80.

Further, the linear guide 80 according to the second embodiment can have a high rigidity against moments in particular, because the linear guide 80 is formed in a so-called DB structure that is constructed so that an extended line of a contact angle line of the ball 40 circulating in an endless circulating path and an extended line of a contact angle line of the ball 40 circulating in another endless circulating path extend toward outside of the track rail 81, and the extended lines intersect on a side of the track rail 81.

Although some advantageous embodiments of the present invention have been described, the technical scope of the present invention is not limited to the range in the above described embodiments. Various modifications and improvements can be applied to the above described embodiments.

For example, the track rails (20, 81) and the movable blocks (30, 82) according to the first and second embodiments are formed linearly, but may be curve-formed.

In addition, for example, the track rails (20, 81) and the movable blocks (30, 82) according to the first and second embodiments may be appropriately modified in cross-sectional shape. Further, the number of the endless circulating paths for the balls 40 may be increased or decreased appropriately.

In addition, in the above described embodiments, formation angles at which each of the loaded region entry and exit groove portions (36, 86) and the unloaded region entry and exit groove portions (37, 87) intersect the direction change guide grooves (35, 85) are specified. However, these formation angles are not limited to any particular angles. In other words, the formation angles for the loaded region entry and exit groove portions and the unloaded region entry and exit groove portions may take a variety of angles, as long as a virtual curve X drawn by the center of the ball 40 are formed along the inner wall surface of a movable block without being formed in a single plane, as well as the direction change guide groove is formed apart from a surface of an outer periphery of a track rail to have a longer distance than a diameter of the ball 40 so that the ball rolling on the direction change guide groove do not come into contact with the surface of the outer periphery of the track rail.

In addition, for example, although the movable blocks (30, 82) according to the first and second embodiments are constructed to form grooves on a single member, such blocks may be formed by inseparably assembling a plurality of members. FIG. 8 is a view illustrating a configuration example of a movable block assembled with a plurality of members, in accordance with the first and second embodiments. As shown in FIG. 8, a movable block 90 is formed so that the block is half separated longitudinally at a central portion 91, in which an insertion hole 93 such as a bolt hole, a key groove, and the like for inserting an assembly member 92 such as a bolt and a key are formed on each cut end surface that is a cut end of the movable block 90. For such an assembly member 92 to be inserted into the insertion hole 93, metal (e.g., such as stainless steel) that expands through heat treatment is used. By assembling and heat treating a movable block having a configuration described above, the movable block 90 is inseparably formed. According to such a configuration, because intricately turned portions of the direction change guide grooves (35, 85) formed on the inner wall surface of the movable block 90 can be carved while the movable block 90 is separated in half, the degree of machining difficulty is lowered, allowing to manufacture linear guides without requiring an end plate in an easy and cost effective manner.

Advantageous embodiments of the present invention and a variety of modified example embodiments that can be taken in the present invention have been described so far. However, various improvements may be further applied for the motion guide devices according to the present invention.

In other words, the linear guides 10, 80 described above are a kind of motion guide devices where the balls 40 fall off when the movable blocks 30, 82, and 90 are removed from the track rails 20 and 81. In such kind of motion guide devices where balls fall off, it is necessary to adopt a method to insert the balls one by one into the grooves, or to produce a special ball insertion machine, and such necessities require improvements for reducing manufacturing costs. In addition, among some users, a motion guide device is used by removing a movable block 30, 82, or 90 from a track rail 20 or 81 in order to measure parallelism of the track rail 20 or 81. For such users, it is advantageous to provide a kind of motion guide devices where no balls 40 fall off in order to expand markets.

For the requirements described above, the inventors have invented a new configuration shown in FIGS. 9 to 12. Next, a motion guide device according to a modified example of the present invention is described with reference to FIGS. 9 to 12. Here, FIG. 9 is a front view of a movable block in accordance with a modified example of the present invention. FIG. 10 is a vertical cross-sectional front view of the movable block in accordance with the modified example of the present invention. FIG. 11 is a perspective, cross-sectional view taken vertically at a central portion of the movable block shown in FIG. 10. FIG. 12 is an enlarged view of a portion indicated by Y shown in FIG. 10.

As shown in FIGS. 9 to 12, a movable block 100 according to a modified example of the present invention is constructed with a movable block main body unit 101 as a moving member main body unit consisting of a metallic material, and a resin material portions 102 consisting of a resin material integrally coupled to this movable block main body unit 101 using an injection molding technique or the like.

On the movable block 100, as in the first and second embodiments described above, a loaded ball rolling groove 103 and an unloaded ball rolling groove 104 are formed. In the modified example of the present invention, for these of the loaded ball rolling groove 103 and the unloaded ball rolling groove 104, the movable block main body unit 101 consisting of a metallic material and the resin material portions 102 consisting of a resin material cooperate to configure each rolling groove. Specifically, as shown in detail in FIG. 12 and other drawings, the movable block main body unit 101 consisting of a metallic material configures groove bottom sides of the loaded ball rolling groove 103 and the unloaded ball rolling groove 104, while the resin material portions 102 consisting of a resin material configures aperture sides of the loaded ball rolling groove 103 and the unloaded ball rolling groove 104.

For portions (groove bottom sides) constituting part of the loaded ball rolling groove 103 and the unloaded ball rolling groove 104 formed in the movable block main body unit 101 consisting of a metallic material, groove aperture portions are greater in size than the diameter of the ball 40. On the other hand, contiguous to the movable block main body unit 101 consisting of a metallic material, the resin material portions 102 consisting of a resin material form remaining portions (aperture sides) of the loaded ball rolling groove 103 and the unloaded ball rolling groove 104, while the groove aperture portions of the loaded ball rolling groove 103 and the unloaded ball rolling groove 104 formed by the resin material portions 102 are smaller in size than the diameter of the ball 40.

Consequently, in the movable block 100 according to the modified example of the present invention, because the loaded ball rolling grooves 103 and the unloaded ball rolling grooves 104 are formed so as to wrap around and hold the balls 40, no balls 40 fall off the movable block 100, even though the movable block 100 is detached from the track rail. In addition, in the movable block 100 according to the modified example of the present invention, as aperture regions of the loaded ball rolling groove 103 and the unloaded ball rolling groove 104 are formed with the resin material portions 102 consisting of a soft material having a larger elastic deformation volume, the balls 40 can be arranged easily into the loaded ball rolling groove 103 and the unloaded ball rolling groove 104 by pushing the balls into the grooves, achieving advantageous and very easy manufacturing.

Furthermore, for a method for integrally coupling the resin material portions 102 consisting of a resin material to the movable block main body unit 101 consisting of a metallic material, any known techniques can be adopted. For example, FIGS. 13(*a*) to 13(*c*) are views illustrating a method for manufacturing the movable block in accordance with the modified example of the present invention. As shown in FIGS. 13(*a*) to 13(*c*), when manufacturing a movable block 100 using molds, by arranging movable molds 201 (see a separate drawing in FIG. 13(*a*)), which move in left and right directions with respect to an inward side of the movable block main body unit 101 by a slide pin 202, and pushing the slide pin into the movable molds 201, the movable molds 201 move in left and right directions to form cavities for forming the resin material portions 102 between the movable block main body unit 101 and the movable molds 201 (see a separate drawing in FIG. 13(*b*)). From this state, by allowing a resin material to flow into the cavities, the movable block 100 according to the modified example of the present invention is finished (see a separate drawing in FIG. 13(*c*)). By using the movable molds 201 like this, the resin material portions 102 can be molded and formed easily.

In addition, in order to securely connect the movable block main body unit 101 consisting of a metallic material and the resin material portions 102 consisting of a resin material, for example, by providing a screw hole, a T-groove, or the like in the movable block main body unit 101 to allow a resin material to flow into the screw hole, the T-groove, or the like, it is possible to achieve secure connection of both members. Incidentally, the screw hole may be a screw hole machined using a tap, and the T-groove may be a T-groove machined using a T-slot cutter.

Further, for methods for connecting the movable block main body unit 101 and the resin material portions 102, any methods may be adopted, including a connection method by baking a rubber material onto a metallic material, a connection method using adhesive, for example, in addition to the methods described above.

In addition, in the present invention, it is possible to adopt a configuration for manufacturing a resin material portions by separating the resin material portions 102 described above, and then assembling the resin material portions with a plurality of other members. The resin material portions constructed by assembling a plurality of other materials can be integrated with the movable block main body unit 101 by using any known connection means including bonding and welding. Even in such resin material portions constructed by assembling such a plurality of other materials, a motion guide device that can demonstrate the same effects and operations with the embodiments described above can be achieved.

Further, the movable block 100 according to the modified example of the present invention described with reference to FIGS. 9 to 13(c) does not negate the mode described with reference to FIG. 3, where the balls 40 are supported by the direction change guide groove 35 having undercut portions. In other words, in the present invention, the balls 40 can be retained by forming such undercut portions for the unloaded ball rolling groove without loads and the direction change guide groove, while the balls 40 can be supported by arranging the resin material portions 102 described above for the loaded ball rolling groove. That is, the undercut portions according to the first and second embodiments described above and the resin material portions 102 according to the modified example may be combined appropriately for use, making it possible to provide a motion guide device superior than other products by adopting any aspect combined in an optimum manner, in accordance with conditions for use, cost, and other factors for the motion guide device.

In addition, in the above description, the loaded ball rolling groove 103 and the unloaded ball rolling groove 104 are illustrated to configure each rolling groove through cooperation of the movable block main body unit 101 consisting of a metallic material and the resin material portions 102 consisting of a resin material. As specifically illustrated in FIG. 11, it is possible to adopt the same configuration for the direction change guide grooves according to the present invention.

It is obvious from the claims described below that the modes arranged or modified as shown above can be included in the technical scope of the present invention.

REFERENCE SIGNS LIST 10, 80 linear guide, 20, 81 track rail, 21 projection, 22, 89 ball rolling groove, 23 through hole, 30, 82, 90, 100, movable block, 31, 91 central portion, 32 side wall unit, 33, 83, 103 loaded ball rolling groove, 34, 84, 104 unloaded ball rolling groove, 35, 85 direction change guide groove, 36, 86 loaded region entry and exit groove portion, 37, 87 unloaded region entry and exit groove portion, 38, 88 groove connection portion, 40 ball, 50 loaded ball rolling path, 60 unloaded ball rolling path, 70 direction change path, 81a recessed portion, 92 assembly member, 93 insertion hole, 101 movable block main body unit, 102 resin material portion, 201 movable mold, 202 slide pin, L1, L1' contact angle line θ1, θ2 contact angle, θ3, θ4, θ5, θ6, θ7 formation angle, X virtual curve.

The invention claimed is:

1. A motion guide device comprising:
a track member having an upper portion with a DF structure, the DF structure including a pair of left and right projections projecting in a width direction of the track member, the pair of left and right projections each including at least two rolling element rolling grooves, each of the rolling element rolling grooves extending in a longitudinal direction of the track member;
a moving member having a plurality of loaded rolling element rolling grooves, a plurality of unloaded rolling element rolling grooves, and a plurality of direction change guide grooves, each of the plurality of loaded rolling element rolling grooves facing a respective one of the rolling element rolling grooves of the track member, each of the unloaded rolling element rolling grooves extending in parallel to a direction in which a respective one of the rolling element rolling grooves extends, each of the direction change guide grooves connecting one of the plurality of loaded rolling element rolling grooves and a respective one of the plurality of the unloaded rolling element rolling grooves, and at least four endless circulating paths being formed, each of the endless circulating paths including a loaded rolling element rolling path arranged between one of the rolling element rolling grooves of the track member and one of the plurality of the loaded rolling element rolling grooves of the moving member, an unloaded rolling element rolling path arranged between the track member and one of the plurality of unloaded rolling element rolling grooves of the moving member, and a direction change path arranged between the track member and one of the plurality of direction change guide grooves of the moving member; and
a plurality of rolling elements arranged on the endless circulating paths,
wherein only the direction change path of at least two of the endless circulating paths extending partially along the pair of left and right projections at the upper portion of the track member has a plurality of change points forming a complex turn in which angles are changed at least twice, each angle being between two adjacent segments of the direction change path in a cross-sectional view orthogonal to the longitudinal direction of the track member, and
wherein the direction change path of at least two of the endless circulating paths extending partially along the pair of left and right projections at a lower portion of the track member does not form the complex turn.

2. The motion guide device according to claim 1, wherein each of the plurality of direction change guide grooves is formed on an inner wall surface of the moving member facing the track member.

3. The motion guide device according to 1, wherein
each of the plurality of direction change guide grooves has a loaded region entry and exit groove portion formed on a side of a respective one of the plurality of loaded rolling element rolling grooves, an unloaded region entry and exit groove portion formed on a side of a respective one of the plurality of unloaded rolling element rolling grooves, and a groove connection portion connecting the loaded region entry and exit groove portion and the unloaded region entry and exit groove portion, and
in the cross-sectional view orthogonal to the longitudinal direction of the track member, a formation angle of the loaded region entry and exit groove portion is an angle orthogonal to a direction of load received by the plurality of rolling elements on the loaded rolling element rolling path.

4. The motion guide device according to claim 3, wherein, in the cross-sectional view orthogonal to the width direction of the track member, an intersection angle formed between an extended line of the loaded region entry and exit groove portion and a line indicating a moving direction of the moving member is 45°.

5. The motion guide device according to claim 1, wherein
the moving member has a moving member main body unit consisting of a metallic material and a resin material portion consisting of a resin material, and
each of the plurality of loaded rolling element rolling grooves, each of the plurality of unloaded rolling element rolling grooves, and each of the plurality of direction change guide grooves are formed by portions of the moving member main body unit and by portions of the resin material portion.

6. The motion guide device according to claim 5, wherein a groove aperture portion of each of the plurality of loaded rolling element rolling grooves, each of the plurality of unloaded rolling element rolling grooves, and each of the plurality of direction change guide grooves are smaller in size than a diameter of the rolling element.

7. The motion guide device according to claim 1, wherein the direction change path of the at least two of the endless circulating paths extending partially along the pair of left and right projections at the upper portion of the track member is not in a single plane.

8. A motion guide device comprising:
- a track member having an upper portion, the upper portion having a DB structure including a pair of left and right recessed portions that are recessed in a width direction of the track member, the pair of left and right recessed portions each including at least two rolling element rolling grooves, each of the rolling element rolling grooves extending in a longitudinal direction of the track member;
- a moving member having a plurality of loaded rolling element rolling grooves, a plurality of unloaded rolling element rolling grooves, and a plurality of direction change guide grooves, each of the plurality of loaded rolling element rolling grooves facing a respective one of the rolling element rolling grooves of the track member, each of the unloaded rolling element rolling grooves extending in parallel to a direction in which a respective one of the rolling element rolling grooves extends, each of the direction change guide grooves connecting one of the plurality of loaded rolling element rolling grooves and a respective one of the plurality of the unloaded rolling element rolling grooves, and at least four endless circulating paths being formed, each of the endless circulating paths including a loaded rolling element rolling path arranged between one of the rolling element rolling grooves of the track member and one of the plurality of the loaded rolling element rolling grooves of the moving member, an unloaded rolling element rolling path arranged between the track member and one of the plurality of unloaded rolling element rolling grooves of the moving member, and a direction change path arranged between the track member and one of the plurality of direction change guide grooves of the moving member; and
- a plurality of rolling elements arranged on the endless circulating paths,
- wherein each of the plurality of direction change paths has a plurality of change points forming a complex turn in which angles are changed at least twice, each angle being between two adjacent segments of the direction change path in a cross-sectional view orthogonal to the longitudinal direction of the track member.

9. The motion guide device according to claim 8, wherein the direction change path of at least two of the endless circulating paths extending partially along the pair of left and right recessed portions at the upper portion of the track member is not in a single plane.

* * * * *